United States Patent [19]

Takenakashima et al.

[11] 4,116,366
[45] Sep. 26, 1978

[54] VACUUM BOTTLE CONTAINER WITH AIR PUMP HAVING VENT CLOSING SWITCH

[75] Inventors: Takefumi Takenakashima, Yao; Toyohiko Takatuki, Izumi, Japan

[73] Assignee: Zojirushi Vacuum Bottle Co., Ltd., Osaka, Japan

[21] Appl. No.: 798,668

[22] Filed: May 19, 1977

[30] Foreign Application Priority Data

Aug. 5, 1976 [JP] Japan .................. 51-93741

[51] Int. Cl.[2] ............. B67D 5/54; F04B 43/04; F04B 49/02; F04B 49/10
[52] U.S. Cl. ................ 222/131; 222/209; 222/401; 222/478
[58] Field of Search ............ 222/209, 211, 333, 385, 222/401, 402, 131, 478

[56] References Cited

U.S. PATENT DOCUMENTS 3,905,520  9/1975  Nishioka ............ 222/209
4,060,182  11/1977  Kikuchi ............. 222/333

FOREIGN PATENT DOCUMENTS 2,013,504  10/1970  Fed. Rep. of Germany ...... 222/333

Primary Examiner—David A. Scherbel
Attorney, Agent, or Firm—Stevens, Davis, Miller & Mosher

[57] ABSTRACT

A vacuum bottle container of the kind having an air pump adapted to feed air into the interior of the vacuum bottle to increase the internal pressure in the bottle, whereby the liquid in the vacuum bottle is poured without inclining or holding up the container. The vacuum bottle comprises a cylindrical body member, a vacuum bottle disposed in the body member, a hollow stopper having a downwardly-extending pumping tube and a transversely-extending pouring tube communicated thereto, and a hollow lid body pivotally mounted on the body member, said lid body including an air pump, a motor for operating the air pump, a battery and a switch connected in the motor driving electric circuit, the lid body being provided at its bottom with an air outlet, a vapor outlet, and a chamber communicated to the interior of the vacuum bottle through the air outlet and to the atmosphere through the vapor outlet. The vapor outlet may be closed before or simultaneously with the closing of the motor driving electric circuit by a valve adapted to be operated by a device for actuating the switch. The provision of the vapor outlet makes it possible to prevent the natural outflow and extra pouring of the liquid in the vacuum bottle.

2 Claims, 5 Drawing Figures

VACUUM BOTTLE CONTAINER WITH AIR PUMP HAVING VENT CLOSING SWITCH

This invention relates to vacuum bottle containers and, more particularly, to vacuum bottle containers having a battery-powered air pump which serves to feed air into the vacuum bottle to increase an internal pressure in the bottle, whereby a liquid, such as hot water or beverages for example, in the bottle is poured therefrom without inclining or holding up the container.

So far, vacuum bottle containers having a manually operated air pump are well known and in wide use. In such conventional containers, the air pump comprises a bellows disposed in a hollow lid body and adapted to be deflated by manually pushing down a knob provided on the upper part of the lid body to feed air into the vacuum bottle. As a rule, the bellows involves a chamber of variable volume, having the maximum volume sufficient to fill a cup with the liquid contained in the bottle. When it is desired to pour a larger amount of the contained liquid, the operating knob has to be pushed down repeatedly, resulting in a troublesome operation.

For the purpose of simplifying the operation, it has been attempted to use a battery-powered air pump. However, the application of an electrical pumping system to the vacuum bottle container of the air pump type presents various problems awaiting solution. For example, it is impossible to use a large bellows pump as in the conventional manual type since it is required to accommodate a motor for driving the pump, and an electric power source such as batteries in a limited space such as the hollow portion of the lid body. Further, the bellows pump is preferably driven directly by the motor without use of any intermediate devices such as reduction gears, so that it is required to use a high speed, miniature bellows pump. The use of such pump causes the blockage of a passage for the entrance of the air into the interior of the connected bottle when the pump is in cessation. For this reason, if the liquid in the bottle is hot water, it flows out naturally under the influence of the vapour pressure in the interior of the bottle even when the pump is in cessation. Another problem is that, even when a switch in the electric circuit for driving the motor has been opened, the complete stopping of the pump is delayed by the inertia of the motor, whereby an extra amount of the liquid is poured from the bottle. For the above reasons, no vacuum bottle container having a battery-powered air pump has been put to practical use.

It is therefore an object of the present invention to provide a vacuum bottle container having a battery-powered air pump, which overcome the aforesaid disadvantages.

Another object of the present invention is to provide a vacuum bottle container having a battery-powered air pump, which is compact and simple in operation.

Still another object of the present invention is to provide a vacuum bottle container having a battery-powered air pump, which makes it possible to pour a large amount of a liquid contained in the vacuum bottle without inclining or holding up the container.

A further object of the present invention is to provide a vacuum bottle container having a battery-powered air pump, which can prevent not only natural outflow of the contained liquid from the vacuum bottle, but also extra pouring of the liquid.

According to the present invention, there is provided a vacuum bottle container having a battery powered air pump adapted to feed air into the interior of the vacuum bottle to increase the internal pressure therein, whereby a liquid in the vacuum bottle is poured therefrom, the container comprising a cylindrical body member, a vacuum bottle disposed in the body member, a cylindrical hollow stopper adapted to close the mouth of the vacuum bottle, the stopper having a downwardly-extending pumping tube and a transversely-extending pouring tube communicating with to the pumping tube, a hollow lid body pivotally mounted on the upper end of the body member, the lid body being provided at its bottom with an air outlet and a vapour outlet, a chamber formed in the lid body and communicated to the interior of the vacuum bottle through the air outlet and to the atmosphere through the vapour outlet, an air pump disposed in the lid body and connected to the chamber, a motor for operating the air pump, the motor being disposed in the lid body and electrically connected to a battery housed in the lid body, a valve for closing the vapour outlet, the valve being operated by a device for operating a switch connected in the motor driving electric circuit.

When the device for operating the switch is actuated, the vapour outlet is preferably closed by the valve before the closing of the switch to increase the pumping efficiency.

The provision of the vapour outlet makes it possible to prevent natural outflow and extra pouring of the liquid.

These and other objects, features and advantages of the present invention will be further apparant from the following description taken in conjunction with the several figures of the accompanying drawings which show, by way of example only, one form of the vacuum bottle container embodying the present invention.

Figure 1:
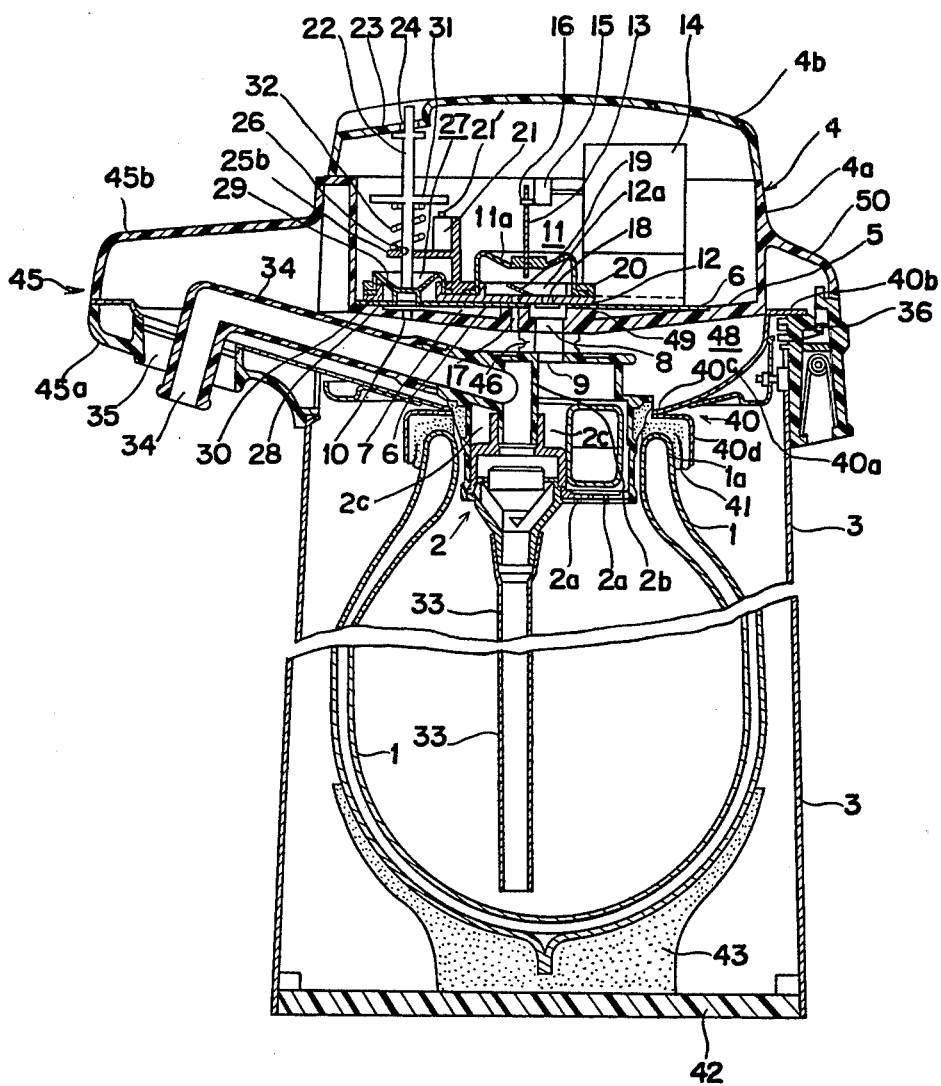
FIG. 1 is a sectional view of a vacuum bottle container according to the present invention.

Referring now to the drawings, and more especially FIG. 1, it will be seen that the vacuum bottle container according to the invention includes a vacuum bottle 1 disposed in a cylindrical body member 3. The vacuum bottle 1 is of the conventional double glass wall construction evacuated and silvered for insulation against cold and heat, and is formed at its open end with a short, upwardly-extending neck portion 1a of a reduced diameter.

The body member 3, which may be of steel for example, is fitted at its upper end with a collar member 40 for holding the vacuum bottle 1 in place. the collar member 40 is integrally formed with an outwardly-curved body portion 40a, and fixedly mounted on the upper end of the body member at its enlarged diameter flange 40b. The reduced diameter annular portion 40c of the collar member 40 is fitted with a cylindrical holding portion 40d extending downwardly. Disposed between the holding portion 40d of the collar member 40 and the neck portion of the vacuum bottle 1 is a resilient annular pad 41 surrounding the neck portion 1a embracing relationship. The body member 3 is also fitted at its lower end with a bottom member 42. Stationary mounted on the bottom member 42 is a supporting member 43 of a resilient material having low heat conductivity, on which the vacuum bottle 1 is seated.

A cylindrical hollow stopper 2 is put on the vacuum bottle 1 to close the mouth at the neck of the vacuum bottle 1. The stopper 2 is provided with a short, downwardly extending tubular portion 2b in its interior to form a passage for the liquid contained in the vacuum bottle 1. A chamber 2c surrounding the tubular portion 2b communicates with the interior of the vacuum bottle 1 through a plurality of air passage holes 2a provided to the bottom of the stopper 2. At the center of the upper part of the stopper 2 there is provided an air inlet 9 through which the air expelled from an air pump 11 is fed into the chamber 2c. The stopper 2 is also provided at its bottom with a pumping tube 33 extending downwardly to the level adjacent to the inner bottom of vacuum bottle 1, and at its peripheral wall with an transversely-extending but upwardly-inclined pouring tube 34 having a downwardly-extending free end. The tube 33 communicates with the tube 34 through the tubular portion 2b. the pouring tube 34 is surrounded by a mouth 45 composed of a mouth half 45a provided for the body member 3 and a mouth half 45b provided for a lid body 4.

Figure 2:
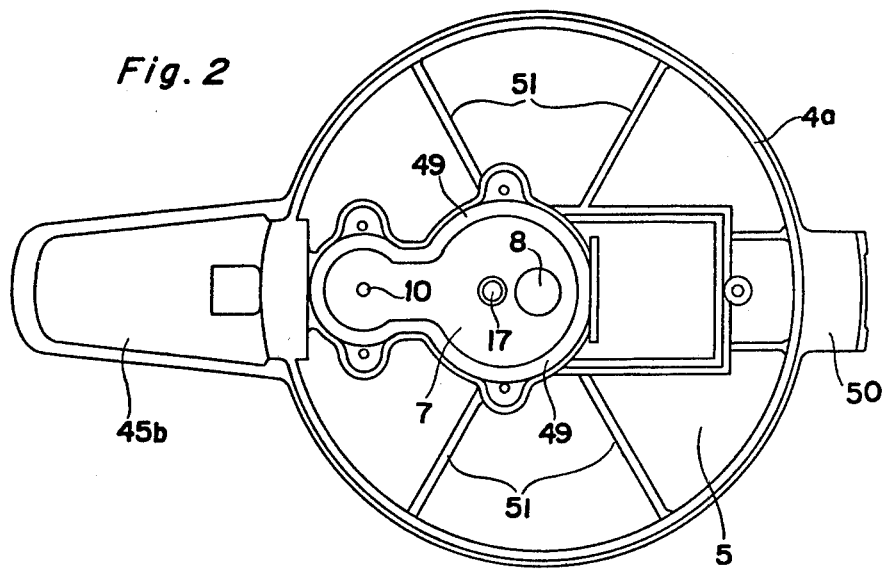
FIG. 2 is a plane view of a lower lid member used in the container shown in FIG. 1.

The hollow lid body 4 pivotally mounted on the upper end of the body member 3 comprises a lower lid member 4a and a upper lid member 4b removably attached thereto, both of which may be molded with synthetic resin. The lower lid member 4a is provided with a mouth half 45b and a tail portion 50 which is pivotally connected with the body member 3. Thus, the lid body is pivotable around the axis 36. As illustrated in FIGS. 1 and 2, the lower lid member 4a has a shallow dish-shaped bottom 5 having at its central part an air outlet 8 adapted to be connected to the air inlet 9 of the stopper 2 through a tubular sealing member 46 of a resilient material, such as rubber for example, fitted to the bottom 5 of the lower lid member 4a. Close to the air outlet 8, there is provided an air suction port or air inlet 17 which is connected to a bellows pump 11 through a short, upwardly extending tubular rib 47 provided to the upper side of the bottom 5, and communicates with the atmosphere through a chamber 48 formed between the bottom 5 of the lower lid member 4a and the collar member 40. Distant from the air inlet 17 there is provided a vapour outlet 10. On the upper side of the bottom there is provided a short, upwardly-extending gourd-shaped rib 49 surrounding the air inlet 17, air outlet 8 and vapour outlet 10, on which a supporting member 6 is mounted to form a chamber 7. The chamber 7 communicates with the interior of the vacuum bottle 1 through the air outlet 8 and with the atmosphere through the vapour outlet 10. The supporting member is provided with three holes at the respective places over the air inlet 17, air outlet 8, and vapour outlet 10. A gap between the supporting member 6 and gourd-shaped rib 49 is sealed by a packing arranged between them, the packing being of a resilient material such as rubber for example. Numeral 51 indicates radially extending ribs united with the bottom 5 for reinforcing the same.

Fixedly mounted on the supporting member 6 is an air pump assembly 11 provided with a bowl-shaped valve for closing the vapour outlet 17.

Figure 3:
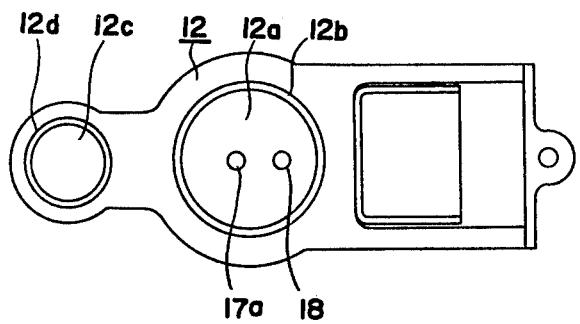
FIG. 3 is a plane view of a base member used in the container shown in FIG. 1.
Figure 4:
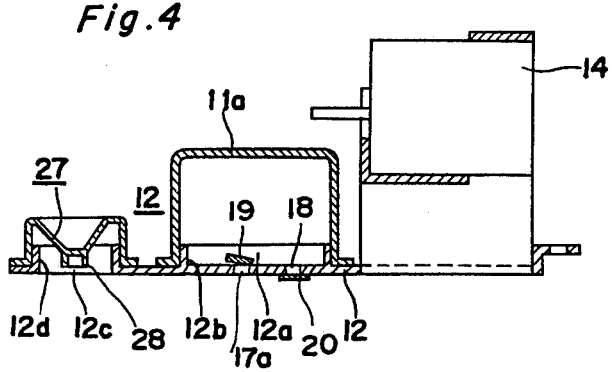
FIG. 4 is a sectional view of a part shown in FIG. 1.

As illustrated in FIGS. 1, 3 and 4, a bellows pump 11 disposed in the lid body 4 comprises a gourd-shaped base member 12 and a bellows 11a secured in a capping manner to the outer circumference of an annular side wall 12b to form a chamber 12a of variable volume on the upper side of the base member 12. The deflatable portion of the bellows 11a is fitted with one end of a rod 13 which is connected at the other end to an eccentric pin 16 provided to a disk 15. The disk 15 is concentrically fixed to the shaft of a driving motor 14, so that the rod 13 is moved up and down by the rotation of the motor 14 to inflate and deflate the bellows 11a. The base member 12 is provided with an air suction port 17a and an air supply port 18 at the bottom of the chamber 12a, which are provided with valves 19 and 20, respectively. These valves 19 and 20 are opened and closed in reverse relations, and the air, drawn into the chamber 12a as it is expanded, is forcely expelled and fed into the interior of the vacuum bottle 1 through the air supply port 18, air outlet 8 and holes 2a on the reduction of the volume of the chamber 12a.

The motor 14 stationary mounted on the rear portion of the base member 12 is electrically connected to an electric power source such as dry cells adapted to be disposed on one side or both sides of the motor 14. In the motor driving circuit, a switch 21 is also electrically conected to switch the motor 14 on or off. The switch 21 is fixed to an arm portion 25b extending transversely from an upwardly-extending projection 25a provided to an upper base 25. The switch 21 is actuated by an operating rod 22.

The operating rod 22 is provided with a flange 31, by which the operating knob 21a of the switch 21 is pressed on the pushing down of the rod 22. The rod 22 is inserted into a hole 26 in the arm portion 25b and a hole 24 in the recess 23 of the upper lid member 4b, and upwardly forced by a spring 32. The upper end of the rod 22 is projected above the recess 23 of the upper lid member 4b and fitted with an operating button (not shown). In order to prevent the imprudent operation by a baby or infant, it is preferred to construct the operating button in such a manner that it can be pushed down only after a slight sliding in the horizontal direction.

A bowl-shaped valve 27 for opening and closing the vapour outlet 10 is secured to the outer circumference of an annular wall 12d formed on the base member 12. To the center portion of the valve 27, the operating rod 22 is fixed at its lower end. The valve 27 is of a resilient material, such as rubber for example, and is arranged in such a manner that the small annular portion 28 at the lower part of the bowl shape is positioned right above the vapour outlet 10, and that the upper periphery of the conical part 29 of the valve 27 is mounted to cap the outer circumference of the peripheral wall 12d of the chamber 12c to fix the valve 27 and seal the upper part of the small chamber 12c. By the above construction, while the conical portion is shrunk during no pouring operation, the small annular portion 28 of the valve 27 is separated from the vapour outlet 10 to open the same, and when the operating rod 22 is pushed down, the conical portion 29 is stretched to bring the small annular portion 28 into rigid contact with the bottom surface 5 and to close the vapour outlet 10. The vapour outlet 10 may be closed by the valve 27 before or simultaneously with the closing of the motor driving electric circuit.

According to the costitution as above, if, on pushing down of the operating rod 22, the timing of the valve 27 to close the steam purging hole 10 and the timing of the switch 21 to be turned on or the timing to start the motor 14 are equal, the rise of the pressure in the inner bottle is slightly delayed, because of which a time lag is invited between the completion of depression of the operating rod 22 and the start of pouring of the contained liquid, resulting in a loss of pump efficiency. In order to prevent this drawback, the mechanism is so constituted as to make the distance between the lower surface of the small annular portion 28 of the valve 27 and the vapour outlet 10 shorter than the distance between the flange 31 of the operating rod 22 and the knob 21' of the switch, for instance, to set the position of the flange 31 in such a manner that, when the operating rod 22 is depressed, the valve 27 closes the vapour outlet 10 first, and then the flange 31 contacts the switch 21 to turn it ON.

Next, an explanation is provided on the operation of the vacuum container having the electrically operated air pump constituted as above.

When the operating rod is forced upwardly by the spring 32, the flange 31 is detached from the switch 21, the switch 29 is in OFF state, the motor 14 is stopped, and the bellows pump 11 is also stopped. The conical flange portion 29 of the valve 27 is shrunk, the small annular portion 28 is separated from the bottom surface 5 of the lid body 4, and the vapour outlet 10 is opened. Provided that hot water is stored in the vacuum bottle, the vapour generated in the vacuum bottle 1 flows into the chamber 7 through the air passage holes 2a of the hollow stopper 2 and the air inlet 9, then it passes through the vapour outlet 10 and is discharged into the atmosphere through the mouth 35 of the vacuum container. By this provision, a pressure rise in the vacuum bottle 1 is prevented, and the natural outflow of the hot water contained in the vacuum bottle 1 is prevented.

Figure 5:
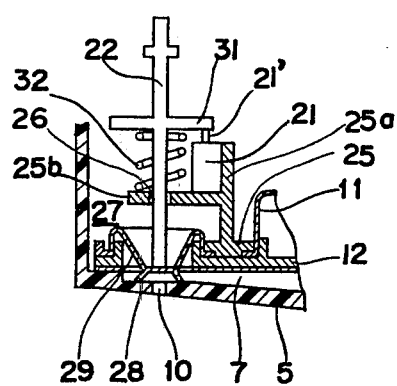
FIG. 5 is an enlarged sectional view showing the closed position of the valve in FIG. 1.

When it is desired to pour the hot water from the vacuum bottle container, the push button (not shown) is slightly slid in the horizontal direction and then pushed downward. By this operation, the operating rod 22 is forced down, and the small annular portion 28 of the valve 27 comes into tight contact with the lower surface 5 to block the vapour outlet 10, by which the chamber 7 is brought into a sealed state. When the operating rod 22 is further depressed, the small annular portion 28 is deformed into a style shown in FIG. 5 to block the vapour outlet 10 further tightly, the flange 31 of the operating rod 22 depresses the knob 21' of the switch 21, by which the switch 21 is closed and the motor 14 begins to rotate. By the rotation of the motor 14, the pin 16 moves up and down, by which the rod 13 is also moved up and down to inflate and deflate upward and downward the deflatable surface 11a of the bellows pump 11. When the bellows pump 11 is inflated upward, the valve 19 is opened upward and the air is passed through the mouth 35 and the air suction port 17 and drawn into the bellows pump 11. On the other hand, when the bellows pump 11 is deflated downward, the valve 19 is closed under the internal pressure of the bellows and the valve 20 is opened, by which the air is fed from the air supplying port 18 to the air inlet 9 and further through the air passage holes 2a provided on the bottom of the hollow stopper 2 and is supplied to the vacuum bottle 1. Then, the internal pressure of the vacuum bottle 1 is increased, and the hot water is pumped up through the pumping tube 33 by the known action and poured from the pouring port 34a.

When the push button operation is discontinued, the operating rod 22 is returned upward by the repellent of the spring 32, by which the valve 27 is brought upward to open the vapour outlet 10, and simultaneously the switch 21 is also turned off to stop the motor 14, and the pouring of the hot water is terminated. Thereafter, while the pouring operation is not made, the vapour in the vacuum bottle is discharged through the vapour outlet 10 and the natural outflow of the stored liquid is prevented, as previously explained.

In case of charging a liquid such as hot water into the vacuum bottle 1, the lid body 4 is pivoted around the axis 36, and the portion above the level indicated in the line a is separated to release the upper part of the body member 3, thereby making it possible to put off the hollow stopper 2 freely and to charge a liquid such as hot water.

As described in detail above, the present invention provides a system for the vacuum container having an air pump wherein the air pump such as the bellows pump is operated by means of an electric motor so as to pour the contained liquid, so that it has the following advantages produced by the introduction of the electrical operation system, i.e., the pouring operation is made only by a switch operation of a single stroke, and the operation can be simplified; also, in case of pouring the stored liquid in a large amount, the desired amount of the contained liquid can be poured by the push button operation of a single stroke, without necessitating the repeated depression of bellows as required in the conventional vacuum bottle container having the manual type air pump. Additionally, because of the construction that a vapour outlet provided in the bottom of the lid body is opened and closed by the valve which is actuated in conjunction with the means of operating the switch for the electric motor, and that the vapour pressure in the vacuum bottle is purged while the pouring operation is not made, a natural outflow of the contained liquid is securely prevented. Moreover, because of the construction that, in case of the pouring, the valve is actuated to close the vapour outlet first and then the pump is started, the inside of the above hollow chamber is subjected to a quick pressure rise to enhance the pump efficiency, and simultaneously the delay of pouring the contained liquid can be prevented.

In case the switch is operated from an ON to an OFF position, the valve is also caused to spring up by the spring force to open the steam purging hole, by which the pouring of the contained liquid is instantly stopped.

Further, the above constitution has an additional advantage that, because a high speed and small size bellows pump can be used, the required parts can be incorporated in the space similar to that of the upper lid body of the known manual air pump type vacuum container, thus being effective for suppressing the trend of enlargement in the size of the lid portion.

What is claimed is:

1. A vacuum bottle container having an air pump adapted to feed air into the interior of the vacuum bottle to increase the internal pressure therein, whereby the liquid in the vacuum bottle is poured therefrom, said container comprising a cylindrical body member, a vacuum bottle disposed in said body member, a cylindrical hollow stopper adapted to close the mouth of the vacuum bottle, said stopper having a downwardly-extending pumping tube and a transversely-extending pouring tube communicating with said pumping tube, a hollow lid body pivotally mounted on the upper end of the body member, said lid body being provided at its bottom with an air outlet and a vapour outlet, a chamber formed in said lid body and communicating with the interior of the vacuum bottle through said air outlet and with the atmosphere through said vapour outlet, an air pump disposed in said lid body and connected to said chamber, a motor for operating said air pump, said motor being disposed in said lid body and electrically connected to a battery housed in said lid body, a valve for closing said vapour outlet, said valve being operated by means for operating a switch connected in the motor driving electric circuit.

2. The vacuum bottle container according to claim 1 wherein said outlet is closed by said valve before closing of said motor driving electric circuit.